United States Patent [19]

La Chance, Sr. et al.

[11] 4,020,277
[45] Apr. 26, 1977

[54] SPACER FOR AERIAL CABLES

[75] Inventors: Ernest Joseph La Chance, Sr., Milford; Leonard Paul Jean, Nashua, both of N.H.

[73] Assignee: Hendrix Wire & Cable Corporation, Milford, N.H.

[22] Filed: Feb. 26, 1976

[21] Appl. No.: 661,718

[52] U.S. Cl. .............................. 174/146; 24/132 R; 24/248 SL; 174/168; 248/61; 248/74 R
[51] Int. Cl.² .................. H02G 7/12; H01B 17/16; F16G 11/00
[58] Field of Search ............... 174/40 CC, 41, 146, 174/154, 155, 156, 160, 168, 170, 172, 173, 174; D8/230; D26/10; 24/735 A, 73 AP, 73 PB, 81 KK, 132 R, 132 CS, 248 SL, 249 SL, 255 SL, DIG. 23; 248/61, 74 R, 74 A, 74 PB

[56] References Cited

UNITED STATES PATENTS

| | | | |
|---|---|---|---|
| 1,172,963 | 2/1916 | Engelhardt | 174/168 |
| 2,453,319 | 11/1948 | Hollyday, Jr. | 174/146 UX |
| 3,300,576 | 1/1967 | Hendrix et al. | 174/146 |
| D216,774 | 3/1970 | Markham | D8/230 |

FOREIGN PATENTS OR APPLICATIONS

| | | | |
|---|---|---|---|
| 1,334,182 | 6/1963 | France | 24/249 SL |
| 899,968 | 12/1953 | Germany | 248/74 PB |
| 884,945 | 12/1961 | United Kingdom | 248/74 R |

OTHER PUBLICATIONS

Advertisement entitled "Insuloid Cradleclip," Electronic Engineering, Oct. 1957, p. 110.
Publication cited by applicants entitled "Hendrix Aerial Cable-Hendri-Clamps," one page, date stamped 1974.

*Primary Examiner*—Laramie E. Askin

[57] ABSTRACT

This disclosure is directed to a spacer for aerial cables for supporting one or more electrical conductor cables above the ground. It includes a body member having at least one concave seat adapted to receive a conductor cable and at least one generally arcuate cable retaining means adapted to engage a surface of the conductor cable and hold it in its seat. One end of the cable retaining means is pivotally supported on the body member. Generally arcuate ratchet tooth means are provided adjacent to the other end of the cable retaining means. Generally arcuate ratchet tooth means are also provided on the body member outwardly of the concave seat. The teeth of the retainer ratchet tooth means are engageable with the teeth of the body member ratchet tooth means when the retaining means is rotated about its pivotal support thereby to firmly hold the conductor cable in the concave seat.

11 Claims, 7 Drawing Figures

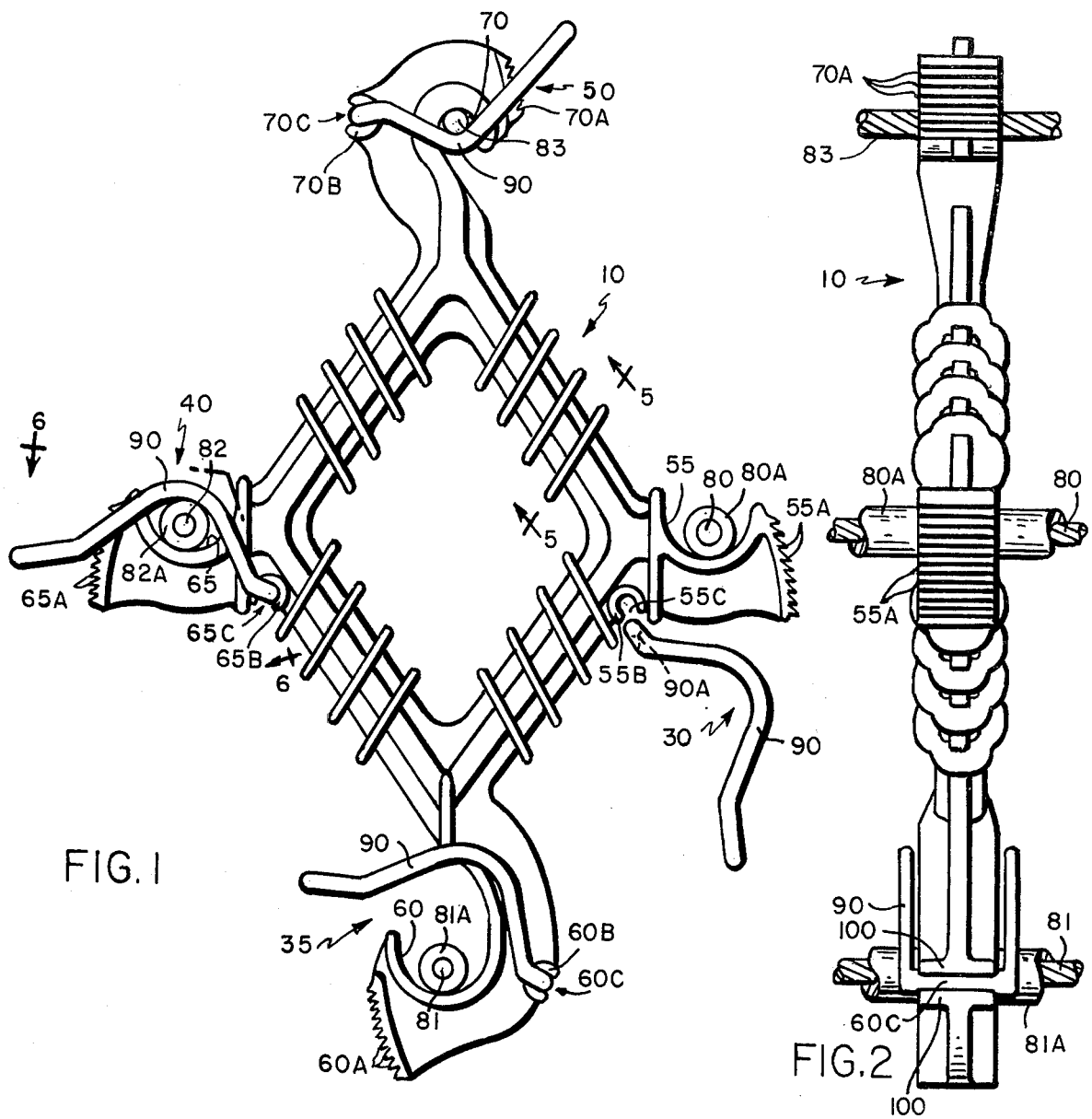
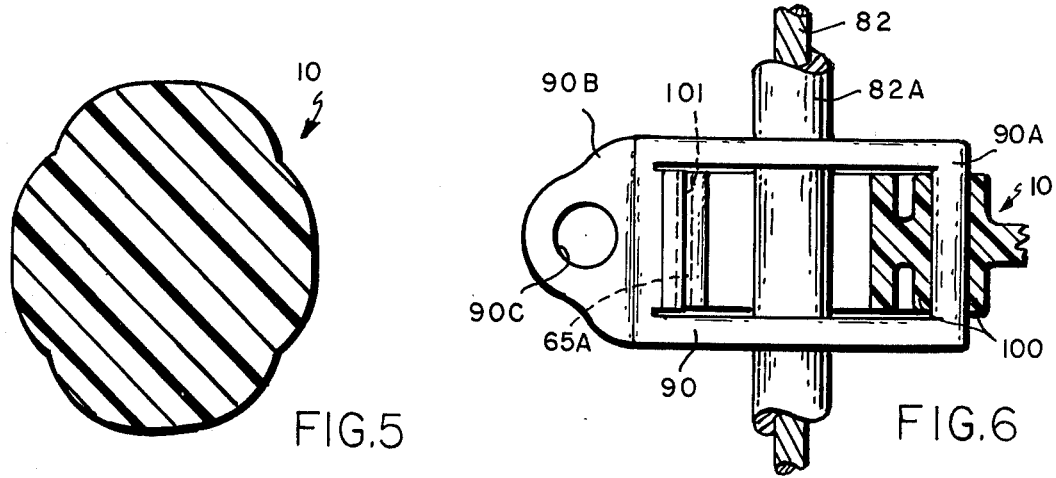

SPACER FOR AERIAL CABLES

BACKGROUND OF THE INVENTION

This invention relates to spacers for aerial cables for supporting one or more electrical conductor cables above the ground.

Overhead conductor cables are commonly suspended from a messenger cable usually made of steel. The messenger cable is supported on poles or towers with the conductor cable spacers arranged at spaced intervals along the messenger cable to suspend one or more conductor cables. Since many power circuits require three phase electric power, it is often convenient to suspend conductor cables in groups of three employing a spacer which supports all three conductor cables and simultaneously maintains the conductors in spaced relation.

If the advantages of suspending conductors in this manner are to be fully availed, it is essential that the spacer be easily attached to the messenger cable and to the conductor cables.

To provide ease of attaching the spacer to the messenger and conductor cables and to reduce the number of parts required, the means for retaining the cables in their respective seats of the body member of the spacer should accommodate messenger and conductor cables of varying cross sectional diameters without providing bushings, sleeves, grommets or the like of different sizes to surround the cables at their seats.

The construction of the spacer should be such that all of its parts have both high mechanical strength and high electrical strength and are durable in use.

In addition, all parts of the spacer should be economical to manufacture and to assemble to the final form of the spacer.

There has been a long felt need for spacers for aerial cables to solve the above-mentioned objectives.

On June 23, 1959 U.S. Pat. No. 2,891,751 was granted to Essex Wire Corporation. The spacer disclosed in that patent comprised three major elements, a body member, a clamping member and a cam lever. The clamping member was pivotally secured to the body member by a metal rivet and the cam lever was pivotally secured to the body member by a headed stud. A generally concave seat or channel received a bushing or sleeve through which the messenger cable passed. Three generally concave seats or channels received three bushings or sleeves through which three conductor cables passed respectively. The clamping member was provided with three outwardly projecting arms and, upon rotation of the clamping member in one direction, the ends of these arms closed the open faces of the seats and engaged the peripheries of the bushings or sleeves surrounding the conductor cables located in the seats.

Upon rotation of the clamping member in the same direction, its cam surface engaged the cam arm or the cam lever causing the cam lever to be rotated about a pivot to close the open face of the messenger seat and to engage the periphery of the bushing or sleeve surrounding the messenger cable in that seat.

The clamping member was locked in closed position by a coil spring and metal latch pin, the end of which was urged into a hole in the body member. To unlock the latch it was necessary to insert the end of a rod, nail or similar instrument into the hole and press the latch against the coil spring until the end of the latch passed completely out of the hole.

To the best of our knowledge, the spacer of this patent has never met with any commercial acceptance in this country, doubtless for reasons which include the following:

1. it contained metal parts thereby adversely affecting the electrical strength of the spacer;
2. bushings or sleeves of different sizes were required to accommodate messenger and conductor cables of different diameters;
3. the parts could not all be molded at the same time from a single mold because they were made of different materials; and
4. it was expensive to manufacture, assemble and install because eleven parts were required, namely two pivot pins, three main spacer parts, two locking member parts, and four bushings or sleeves.

On Mar. 21, 1961 U.S. Pat. No. 2,976,344 was granted to Robert L. Bethel. The spacer disclosed in this patent consisted of four links the ends of which were secured together by hinges or knuckles and cup screws having flanges and polygonal heads. The heads were tightened or loosened by a socket wrench. The messenger cable was surrounded by a grommet made of rubber or plastic. The conductor cables insulated by sheaths of polyethylene were surrounded by grommets also made of rubber or plastic.

To install the spacer on messenger and conductor cables, the parts of the lower cup screw were disengaged and the other cup screws were loosened. Then the upper ends of the upper two links were separated by rotating them about the loosened upper cup screw and then they were rotated towards each other until their semi-cylindrical recesses gripped the grommet of the messenger cable. Then the lower ends of the upper and lower links were rotated towards each other until their semicylindrical recesses engaged the grommets surrounding the insulation of the cables. Then the parts of the lower cup screw were engaged and all of the cup screws were tightened so that all of the grommets were gripped tightly by the semi-cylindrical recesses at the junctions of the links.

To the best of our knowledge, the spacer of this patent was never manufactured or sold commercially in this country, doubtless for reasons which include the following:

1. grommets of different sizes were required to accommodate messenger cables and conductor cables of different diameters;
2. it was very difficult to install because of the time consuming installation of the grommets about the cables and the time consuming successive rotations of the four links about the four cup screws and then the successive tightening of the cup screws; and
3. it was expensive to manufacture and to assemble because (1) the parts could not all be molded at the same time from a single mold and (2) at least nine parts were required, namely, at least one cup screw part, one threaded stud, the four links, a Nylon bushing, and grommets of at least two different sizes, one for the smaller diameter messenger cable and another for the conductor cables.

On Jan. 24, 1967 U.S. Pat. No. 3,300,576 was granted to Hendrix Wire & Cable Corp., the owner of the present patent application. The body of the spacer disclosed in said patent was made of high density polyethylene which has a low dielectric constant and is weather and track resistant.

The body was provided with a generally concave messenger seat and three generally concave conductor cable seats. Elastic ties were provided, each having a ring at each end and a plurality of ball-like enlargements adjacent to one or both ends. These ties were made of polyurethane which has a low dielectric constant and is weather and track resistant. However, because the body of the spacer and the ties were made from different plastic materials, one mold could not be used to mold both the body of the spacer and the ties at the same time from a mold cut to make both of them.

To apply the tie to a conductor cable located in a seat, it was necessary to insert a reduced portion near one end of the tie into one of the slots provided in the lower edge of the member forming one of the conductor cable seats, pass the tie around the insulation of the conductor cable, stretch the tie very tightly about the cable and insert a reduced portion near one of the enlargements into another slot.

In 1969 Hendrix Wire & Cable Corp. introduced to the market in this country what it called its "LLD-7PD" and "LLD-15PD" spacers. The body of each spacer was of an open diamond shape somewhat like that shown in the Bethel patent but it was molded in one piece of high density polyethylene. The body had generally concave seats, one to receive a messenger cable and three to receive conductor cables. Each of the ties for retaining the cables in the seats was a hollow oval shape having a ring at one end. They were called "RT Ring Ties". They were made of thermoplastic polyurethane, ethyl propylene rubber (vulcanized or cross linked) or thermoplastic rubber, all weather and track resistant materials which are stretchable. The ties and body of the spacer could not be molded at the same time from one mold because they were made of different thermoplastic materials.

Slots were provided in the lower edges of the members forming the conductor cable seats similar to the slots in U.S. Pat. No. 3,300,576. Slots were also provided in the upper edge of the member forming the concave messenger cable seat. The ring ties were applied to a cable by inserting one end of the loop of the tie in one of the slots, grasping the ring at the other end, stretching the tie over an insulated conductor cable and then inserting the loop at the end of the tie adjacent to the ring in another slot adjacent to the first slot.

It was necessary to provide ring ties of five different lengths to accommodate conductor cables and messenger cables of different diameters.

These ties were an improvement upon the ties shown in U.S. Pat. No. 3,300,576 but they were expensive to manufacture and difficult and time consuming to apply to a cable because of the necessity of exerting very strong stretching forces upon them while they were being applied.

The spacer for aerial cables of the present invention is a great improvement upon all of the aforesaid prior art and it satisfies the long-felt need for spacers which solve the abovementioned objectives.

BRIEF SUMMARY OF THE INVENTION

One object of this invention is to provide a new spacer for aerial cables.

Another object is to provide such a spacer which is economical to manufacture and to assemble and which is durable in use.

A further object is to provide such a spacer which is free from bushings, sleeves and grommets surrounding the messenger and conductor cables and which can accommodate cables of a wide range of cable sizes.

Yet another object is to provide such a spacer all parts of which are made of the same thermoplastic material and can be molded at the same time with a mold cut to make all parts.

A still further object is to provide such a spacer which is both weather and track resistant.

Another object is to provide such a spacer which includes novel cable retaining means which resist forces tending to pull cables out of their seats and which have extra holding power when such forces are exerted.

Still another object is to provide such a spacer which includes novel means for pivotally supporting one end of the cable retaining means.

Further objects and advantages of this invention will be apparent to persons skilled in the art from the following description taken in conjunction with the accompanying drawings.

In general, a spacer embodying this invention includes a body having at least one generally concave seat which is adapted to receive a conductor cable, and first generally arcuate ratchet tooth means on the body located outwardly from the concave seat. The body also includes generally arcuate cable retaining means which is adapted to engage a surface of a conductor cable positioned in the seat. In addition, means for pivotally supporting one end of the retaining means is provided on the body adjacent to the side of the seat which is located opposite to the first ratchet tooth means. The cable retaining means is provided with second generally arcuate ratchet tooth means spaced from the pivot means for engaging the first ratchet tooth means.

Upon rotation of the retaining means to cable engaging position, the teeth of the second ratchet tooth means engage the teeth of the first ratchet tooth means and firmly hold a conductor cable in the seat.

In a preferred embodiment, both the cable retaining means and the body are made of the same thermoplastic material so they can be molded at the same time with a mold cut to make both of them. Preferably both the retaining means and the body are made of high density polyethylene which has a low dielectric constant and is both weather and track resistant.

In a preferred embodiment, the retaining means includes a pair of spaced generally arcuate arms, connected together at one end by a generally cylindrical member and at the other end by a member which includes the second ratchet tooth means. In this embodiment, the generally cylindrical member is pivotally supported in socket means which extends transversely of the body adjacent to one side of the concave seat.

In another preferred embodiment, the socket means includes a slot through which the generally cylindrical member may be snapped to position it in the socket.

In yet another preferred embodiment, the tooth engaging surfaces of the first ratchet tooth means are located in planes which intersect each other at a line on the body which is above and spaced inwardly of the axis of the socket means so that pressure exerted upon the teeth of the second ratchet tooth means tends to lock them with a closing force against the teeth of the first ratchet tooth means.

According to another embodiment, the body of the spacer includes a generally concave messenger seat spaced from the conductor seat and which is adapted to receive a messenger cable and third generally arcuate ratchet tooth means located outwardly from the messenger seat. The spacer also includes second generally arcuate retaining means adapted to engage the surface of a messenger cable which is positioned in the messenger seat. The body also includes means for pivotally supporting one end of the second retaining means and this pivotally supporting means is located adjacent to the side of the messenger seat which is opposite to the third ratchet tooth means. The second retaining means includes a fourth generally arcuate ratchet tooth means spaced from the pivotally supporting means and the teeth of this fourth ratchet tooth means are adapted to engage the teeth of the third ratchet tooth means when the second retaining means is in one position. Thus, upon rotation of the second retaining means to cable engaging position, the teeth of the fourth ratchet tooth means engage the teeth of the third ratchet tooth means and thereby hold a messenger cable in the messenger seat.

In still another embodiment, the body of the spacer is generally diamond-shaped, has a transverse opening therethrough and has at least three concave seats adjacent to three of the respective apices of the triangle body. Each seat is adapted to receive a conductor cable. The body of the spacer includes three generally arcuate body ratchet tooth means located outwardly respectively from the concave conductor seats. The spacer includes three generally arcuate cable retaining means. The body of the spacer includes means for pivotally supporting one end of the cable retaining means adjacent respectively to the sides of the seats which are located opposite to the body ratchet tooth means. Each retaining means includes a generally arcuate retainer ratchet tooth means for engaging one of the body ratchet tooth means. Thus, upon rotation of the retaining means to conductor cable engaging positions, their ratchet teeth engage the teeth of the body ratchet tooth means and hold the conductor cables in their seats.

It will be apparent to persons skilled in the art that this invention has solved the above-described, long-felt need and satisfied the above-described objects.

BRIEF DESCRIPTION OF THE DRAWINGS

FIG. 1 is an elevational view of a spacer for aerial cables embodying this invention with two of the second generally arcuate ratchet tooth means in cable-engaging positions, one in an open position and one with its generally cylindrical end member in position to be inserted into the socket means of the spacer body member;

FIG. 2 is a side elevational view looking from right to left at the spacer of FIG. 1 but with two of the second ratchet tooth means omitted for clarity;

FIG. 5 is an enlarged section taken on the lines 5—5 of FIG. 1;

FIG. 6 is an enlarged section taken on the lines 6—6 of FIG. 1; and

DETAILED DESCRIPTION OF THE EMBODIMENT SHOWN IN THE DRAWINGS

Figure 3:
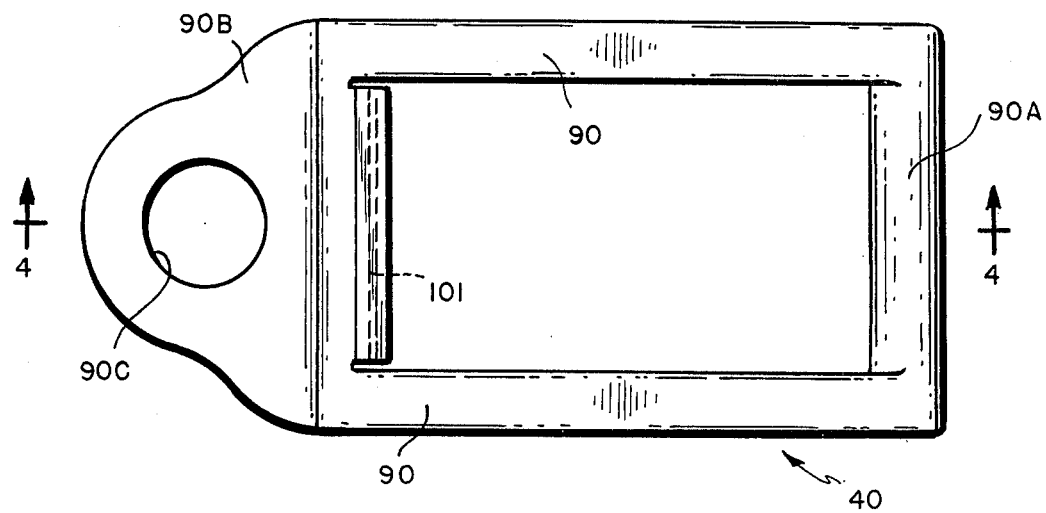
FIG. 3 is an enlarged plan view of one of the second ratchet tooth means.

The spacer shown in the drawings includes a body 10 and four generally arcuate retaining means 30, 35, 40 and 50. The retaining means 30, 35 and 40 are identical. The retaining means 50 is the same as the other retaining means except that it is narrower, shorter and has one fewer ratchet teeth.

Both the body and the retaining means are made from the same thermoplastic material, the preferred embodiment being high-density polyethylene which has a low dielectric constant and has both weather and track resistant qualities. They may be molded at the same time with a mold cut to make all of them.

The body is provided with three generally concave conductor cable seats 55, 60 and 65 and a generally concave messenger seat 70.

The body is provided with four generally arcuate ratchet tooth means 55A, 60A, 65A and 70A located outwardly from the concave seats 55, 60, 65 and 70.

Conductor cables 80, 81 and 82 are positioned in the seats 55, 60 and 65 and they are provided with insulating sheaths 80A, 81A and 82A.

The messenger cable 83 is positioned in the concave messenger seat 70.

Each retaining means comprises a pair of spaced generally arcuate arms 90 (FIGS. 3 and 4), connected together at one end by a generally cylindrical member 90A and at the other end by a transverse member 90B. The transverse member 90B is provided with a hole or perforation 90C.

The body also comprises semi-cylindrical sockets 55B, 60B, 65B and 70B which are located adjacent to the sides of the seats 55, 60, 65 and 70 respectively and these sockets are located adjacent to the sides of the seats which are opposite to the sides of the seats on which the body ratchet tooth means are located. These sockets are provided with slots 55C, 60C, 65C and 70C which are formed in part between the flanges 100 which form reinforcements for the sockets (see FIGS. 2 and 6).

The generally cylindrical members 90A of the retaining means are snapped through the slots 55C, 60C, 65C and 70C thereby to rotatively position them in the sockets 55B, 60B, 65B and 70B respectively.

Figure 4:
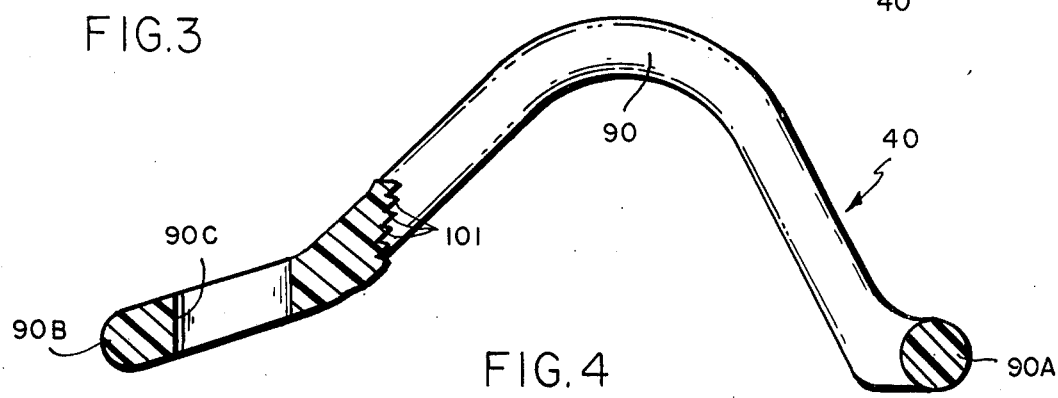
FIG. 4 is a section taken on the lines 4—4 of FIG. 3.

The transverse members 90B of the retaining means are each provided with generally arcuate ratchet tooth means 101 (see FIGS. 4 and 6). Upon rotation of the retaining means relative to the sockets, the central curved portions of the arms 90 engage the peripheries of the cables and the teeth of the retainer ratchet tooth means engage the teeth of the body member ratchet tooth means thereby to hold the cables in their respective seats.

Figure 7:
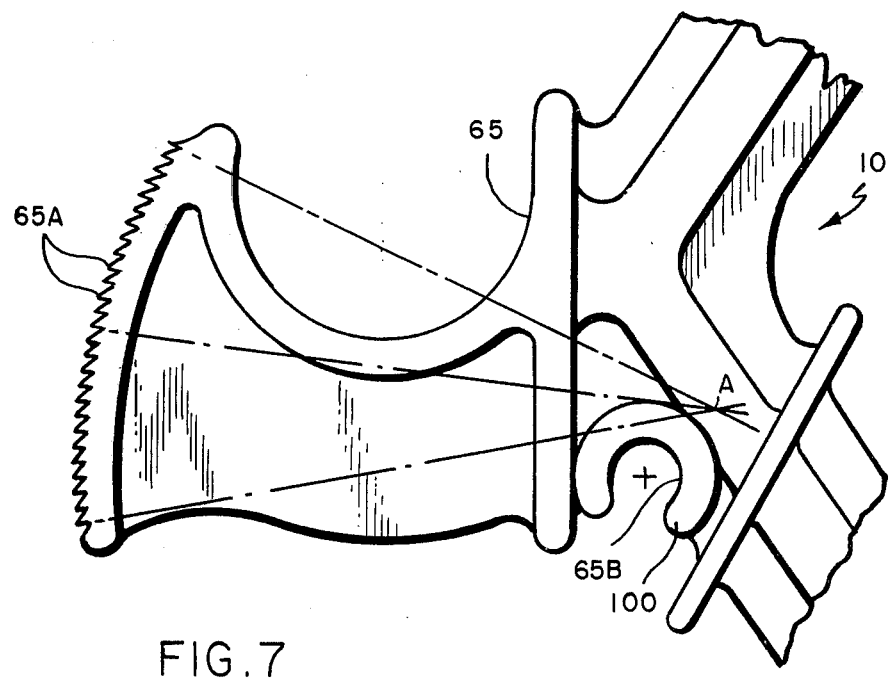
FIG. 7 is an enlarged elevational view of a generally concave conductor seat, the major portion of the body of the spacer being broken away, and the first generally arcuate ratchet tooth means with the planes of three of the tooth engaging surfaces of the ratchet teeth shown in dot dash lines intersecting each other at a line on the body which is above and spaced inwardly from the axis of the socket means which receives the generally cylindrical end member of the second generally arcuate ratchet tooth means.

As shown in FIG. 7, the planes of the tooth engaging surfaces of each body member ratchet tooth means intersect each other at a line A on the body member which is above and spaced inwardly of the axis of the socket means. Accordingly, when pressures are exerted upon the teeth of the retaining means ratchet teeth, the body member ratchet teeth tend to lock the retaining means in closed position.

The holes or perforations 90C may be used to close and open the retaining means by inserting a screwdriver or other elongate tool through them and, using the tool as a lever, either to tighten the retaining means with respect to the cables or to pry them open so that they may be rotated to open position in the event it becomes necessary to repair or replace the cables.

To assemble the parts of the spacer, it is only necessary to snap the generally cylindrical members 90A into the slots 55C, 60C, 65C and 70C.

To install the spacer upon the messenger and conductor cables, the retaining means are rotated to open positions in which they are temporarily retained because of the snug fits between the generally cylindrical members 90A and the sockets 55B, 60B, 65B and 70B. The messenger seat 70 is then placed over the messenger cable 83 and the retaining means adjacent to it is partially closed to hold the messenger cable in its seat. Then the conductor cables 80, 81 and 82 are positioned in the seats 55, 60 and 65 and the retaining means associated with those seats are rotated to closed positions so that their ratchet teeth engage the ratchet teeth of the body ratchet tooth means, and the central portions of the generally arcuate arms 90 firmly contact the insulating sheaths 80A, 81A and 82A of the conductor cables. Thus the conductor cables are firmly held in their respective seats. Finally the retaining means for the messenger cable is rotated to fully closed position so that the central portion of its generally arcuate arms 90 firmly contacts the messenger cable thereby to firmly hold it in its seat 70.

It will be apparent to persons skilled in the art that a spacer embodying this invention is new, economical to manufacture and assmble and durable in use. It is also free from bushings, sleeves and grommets surrounding the messenger and conductor cables and the spacer can accommodate a wide range of cable sizes. Furthermore, it consists of only three parts, the body 10, three identical retaining means 30, 35 and 40 and one slightly smaller retaining means 50 and all three of these parts are made of the same thermoplastic material at the same time using a single mold cut to make all of them. The body and the retaining means are weather and track resistant. In addition, the novel cable retaining means resist forces tending to pull the cables out of their seats. The retaining means also includes novel means for pivotally supporting one end of the retaining means.

While one desirable embodiment of spacer for aerial cables embodying the invention has been shown in the drawings, it is to be understood that this disclosure is for the purpose of illustration only, and that various changes in shape, proportion and arrangement of parts as well as the substitution of equivalent elements for those shown and described herein may be made without departing from the spirit and scope of the invention as set forth in the appended claims.

We claim:

1. In a spacer for aerial cables comprising,
 a body and at least one generally concave seat on said body, said seat being adapted to receive a conductor cable,
 the improvement comprising,
 first generally arcuate ratchet tooth means on said body located outwardly from said concave seat,
 generally arcuate retaining means adapted to engage a surface of a conductor cable positioned in said seat, and pivot means operative independently of the relative position of said retaining means to said body for maintaining a pivotal connection therebetween, said pivot means being located adjacent to the side of said seat which is located opposite to said first ratchet tooth means,
 said retaining means comprising second generally arcuate ratchet tooth means spaced from said pivot means for engaging said first ratchet tooth means,
 whereby upon rotation of said retaining means to cable engaging position, the teeth of said second ratchet tooth means engage a teeth of said first ratchet tooth means and thereby are adapted to hold a conductor cable in said seat.

2. A spacer according to claim 1 wherein both the retaining means and the body are made of the same thermoplastic material.

3. A spacer according to claim 1 wherein the retaining means is made of high density polyethylene.

4. A spacer according to claim 1 wherein both the retaining means and the body are made of high density polyethylene.

5. A spacer according to claim 1 wherein the retaining means comprises a pair of spaced generally arcuate arms, connected together at one end by a generally cylindrical member and at the other end by a member which includes said second ratchet tooth means.

6. A spacer according to claim 1 wherein said pivot means comprises socket means extending transversely of said body adjacent to one side of said concave seat.

7. A spacer according to claim 6 wherein said retaining means comprises a generally cylindrical member which is rotatably received by said socket means.

8. A spacer according to claim 7 wherein said socket means comprises a slot through which said generally cylindrical member may be snapped to retain it in said socket means.

9. A spacer according to claim 1 wherein the tooth engaging surfaces of said first ratchet tooth means are located in planes which intersect each other at a line on said body which is above and spaced inwardly of the axis of said pivot means, whereby pressure exerted upon the teeth of said second ratchet tooth means tends to lock them with a closing force against the teeth of said first ratchet tooth means.

10. In a spacer according to claim 1 which also comprises a generally concave messenger seat on said body spaced from said conductor seat and adapted to receive a messenger cable, the improvement comprising,
 third generally arcuate ratchet tooth means on said body located outwardly from said messenger seat,
 second generally arcuate retaining means adapted to engage a surface of a messenger cable positioned in said messenger seat, and pivot means operative independently of the relative position of said second retaining means to said body for maintaining a pivotal connection therebetween, said pivot means being located adjacent to the side of said seat which is located opposite to said third ratchet tooth means,
 said second retaining means comprising fourth generally arcuate ratchet tooth means spaced from said pivot means for engaging said third ratchet tooth means,
 whereby upon rotation of said second retaining means to cable engaging position, the teeth of said fourth ratchet tooth means engage the teeth of said third ratchet tooth means and thereby are adapted to hold a messenger cable in said messenger seat.

11. A spacer according to claim 1 in which said body comprises, a generally diamond-shaped body having a transverse opening therethrough and at least three concave seats adjacent to three of the respective apices of the triangle body, each seat being adapted to receive a conductor cable, the improvement comprising, three generally arcuate ratchet tooth means on said body located outwardly respectively from said concave conductor seats, three generally arcuate retaining means, and pivot means operative independently of the relative position of said retaining means to said body for maintaining pivotal connections therebetween, said pivot means being located adjacent to the sides of said seats which are located opposite to said body ratchet tooth means, each of said retaining means comprising a generally arcuate retainer ratchet tooth means for engaging one of said body ratchet tooth means, whereby upon rotation of said retaining means to conductor cable engaging positions, their teeth engage the teeth of the body ratchet tooth means and thereby are adapted to hold conductor cables in said seats.

* * * * *

UNITED STATES PATENT OFFICE
CERTIFICATE OF CORRECTION

Patent No. 4,020,277      Dated April 26, 1977

Inventor(s) Ernest Joseph LaChance, Sr., et al.

It is certified that error appears in the above-identified patent and that said Letters Patent are hereby corrected as shown below:

Column 8, line 14, substitute "the" for "a".

*Signed and Sealed this*

Twenty-eighth *Day of* June 1977

[SEAL]

Attest:

RUTH C. MASON
*Attesting Officer*

C. MARSHALL DANN
*Commissioner of Patents and Trademarks*